US012729284B2

(12) United States Patent
Fang Gang et al.

(10) Patent No.: US 12,729,284 B2
(45) Date of Patent: Sep. 8, 2026

(54) PEROXIDE FORMULATIONS WITH ANTI-SCORCH PROPERTIES

(71) Applicant: Arkema France, Colombes (FR)

(72) Inventors: Frank Fang Gang, Changshu (CN); Leonard Palys, King of Prussia, PA (US); Jean-Pierre Disson, Pierre-Benite Cedex (FR); Long Chen, Changshu (CN)

(73) Assignee: Arkema France, Colombes (FR)

( * ) Notice: Subject to any disclaimer, the term of this patent is extended or adjusted under 35 U.S.C. 154(b) by 222 days.

(21) Appl. No.: 18/730,338

(22) PCT Filed: Jan. 24, 2023

(86) PCT No.: PCT/EP2023/051693

§ 371 (c)(1),
(2) Date: Jul. 19, 2024

(87) PCT Pub. No.: WO2023/144147

PCT Pub. Date: Aug. 3, 2023

(65) Prior Publication Data

US 2025/0115738 A1 Apr. 10, 2025

(30) Foreign Application Priority Data

Jan. 25, 2022 (FR) ...................................... 2200638

(51) Int. Cl.

| | |
|---|---|
| ***C08K 5/14*** | (2006.01) |
| ***C08K 5/00*** | (2006.01) |
| ***C08K 5/541*** | (2006.01) |
| ***C08K 11/00*** | (2006.01) |
| ***C08L 23/06*** | (2006.01) |

(52) U.S. Cl.

CPC .............. *C08K 5/14* (2013.01); *C08K 5/0008* (2013.01); *C08K 5/541* (2013.01); *C08K 11/00* (2013.01); *C08L 23/06* (2013.01)

(58) Field of Classification Search

CPC .. H01B 7/29; C08K 5/14; C08K 5/541; C08L 23/06; C09D 123/06

See application file for complete search history.

(56) References Cited

U.S. PATENT DOCUMENTS 12,018,139 B2 * 6/2024 Disson .................. H10F 19/804
2017/0267832 A1 * 9/2017 Pavlek ................ B29C 35/0805
2020/0385545 A1 12/2020 Disson et al.
2021/0139671 A1 * 5/2021 Chaudhary ............. C08L 23/08
2021/0238398 A1 * 8/2021 Kim ......................... G02B 1/04
2025/0129240 A1 * 4/2025 Disson .................. H10F 19/804

FOREIGN PATENT DOCUMENTS

CN 111373549 B * 3/2024
WO 2016094161 A1 6/2016
WO 2016149898 A1 9/2016
WO 2018046700 A1 3/2018
WO 2019115975 A1 6/2019

OTHER PUBLICATIONS

LUPEROX 101 organic peroxide data sheet harwickstandard.com (2 pages) (no pub date).*

Luo et al "Vinyl-Functionalized Polyolefins for Fast Photovoltaic Cell Encapsulation", ACS Appl. Polym. Mater. 2020, 2, 2571-2577.*

Willis et al "Investigation of test methods, material properties, and processes for solar cell encapsulants", Springborn Laboratories, Inc. Apr. 1982 (72 pages).*

Cuddihy "Photovoltaic Module Encapsulation Design and Materials Selection: vol. II", Prepared for U.S. Department of Energy Through an Agreement with National Aeronautics and Space Administration, Jun. 1, 1984.*

Saleesung et al "Cure and scorch in the processing of ethylene-propylene-diene terpolymer (EPDM)", J. Appl. Polym. Sci. 2017, DOI: 10.1002/APP.44523.*

ISA/EP: International Search Report and Written Opinion for International Patent Application No. PCT/EP2023/051693 dated Jun. 6, 2023, 7 pages.

* cited by examiner

*Primary Examiner* — Mark Kopec
(74) *Attorney, Agent, or Firm* — Rimon P.C.; Allyn B. Elliott

(57) ABSTRACT

The invention relates to an organic peroxide formulation comprising: —at least one organic peroxide having a one hour half-life temperature of from 90° C. to 130° C., and —at least one drying oil, wherein the weight ratio of the drying oil to the organic peroxide is lower than or equal to 0.60. The invention also relates to a composition comprising at least one polymer and such an organic peroxide formulation, to preparation methods thereof, and to a method for manufacturing an article using such a composition.

15 Claims, No Drawings

PEROXIDE FORMULATIONS WITH ANTI-SCORCH PROPERTIES

CROSS REFERENCE TO RELATED APPLICATIONS

This application is a U.S. National Stage Application of International Patent Application No. PCT/EP2023/051693, filed on Jan. 24, 2023, which claims priority to French Patent Application No. FR2200638, filed on Jan. 25, 2022.

TECHNICAL FIELD

The present invention relates to organic peroxides formulations comprising a drying oil and to polymer compositions comprising such organic peroxides formulations, that are especially useful for manufacturing photovoltaic modules. The present invention also pertains to articles obtainable by curing said polymer compositions.

TECHNICAL BACKGROUND

Solar modules (also called photovoltaic modules) are arousing increasing interest, owing to the renewable non-polluting nature of the resulting energy. A solar module comprises a photovoltaic cell consisting of optoelectronic components which generates an electric voltage when exposed to light.

Conventionally, in solar modules, photovoltaic cells are placed between an upper (or front) protective layer (also called front sheet), typically a glass or plastic plate, and a rear protective panel (commonly called backsheet), often made of plastic, or of glass. Classically, the photovoltaic cells are encapsulated by a polymeric material (called encapsulant), applied as a film on either the front side or both sides of the photovoltaic cells, in order to assemble and bond the photovoltaic cells and the protective layers (such as the upper protective layer usually made of glass), to provide electrical insulation and to protect photovoltaic cells from outdoor environmental elements, especially moisture and UV radiation.

As encapsulants, materials based on ethylene polymers are generally used. In particular ethylene-vinyl acetate (EVA) copolymers are widely used, since they are able to produce transparent materials capable of adhering readily to the substrates of a photovoltaic module, while having a high electrical resistivity. Other polymers useful for producing encapsulant materials include polyolefin elastomers (POE).

To acquire thermomechanical properties required for this application, especially in terms of adhesion properties, creep resistance, and resistance to degradation relative to weather adversities, the polymers of the encapsulant must be crosslinked.

The photovoltaic modules are generally produced by a laminating process. Several module technologies exist. In conventional modules, the encapsulant layer is positioned between the photovoltaic cells and the glass front protective layer, and the rear protective panel is made of other types of protective films. In the so-called "double glass technology", a transparent EVA or POE layer forms the top encapsulation layer (between the glass front protective layer and the cells), and a white film (often also made of EVA or POE) is positioned between the back of the cells and the glass rear protective panel. The laminated layers forming the module are then pressed and the encapsulant layers are crosslinked (or cured) by heating, simultaneously or subsequently to the pressing step. The encapsulant layers are generally produced by an extrusion step.

If premature decomposition of the organic peroxides occurs during the extrusion step, the polymer compositions used to form the encapsulant layers are susceptible to premature crosslinking over time in the barrel or head of the extruder in which it is processed, prior to the formation of the laminated structure. This phenomenon, which is called "scorching", results in irregularities (inhomogeneity, surface roughness) in the polymer sheet thus formed and intended to encapsulate the photovoltaic cells. The presence of these irregularities impairs the appearance and properties of the photovoltaic module. Moreover, in some cases, pressure may also build up in the extruder, which requires discontinuing the extrusion process and, as a result, productivity is slowed down.

Some peroxide formulations with anti-scorching properties have thus been developed.

For example, document WO 2019/115975 relates to the use of a combination of two different monoperoxycarbonates for crosslinking a polyolefin elastomer.

Documents WO 2016/149898 and WO 2018/046700 describe curable compositions comprising an ethylene polymer, a monoperoxycarbonate and a t-alkyl hydroperoxide in specific amounts.

In addition to scorch protection, it is also desirable to achieve a high crosslinking density. Indeed, if the crosslinking density is too low, the resulting material is likely to suffer, among other things, from insufficient tear and breaking resistance, and to flow over time because of the high temperatures which may be reached by the upper faces of the photovoltaic modules. However, the anti-scorching compositions disclosed in the prior art do not always allow to achieve excellent crosslinking densities. It is also preferable that once the laminated structure is formed and heated above the decomposition temperature of the peroxides, crosslinking proceed fast to improve productivity.

There is thus a need for an organic peroxide formulation making it possible to reduce scorching while providing a good crosslinking density and a fast crosslinking.

SUMMARY OF THE INVENTION

It is a first object of the invention to provide an organic peroxide formulation comprising:

- at least one organic peroxide having a one hour half-life temperature of from 90° C. to 130° C., preferably having a one hour half-life of from 110° C. to 125° C., and
- at least one drying oil, wherein the weight ratio of the drying oil to the organic peroxide is lower than or equal to 0.60.

In some embodiments, the at least one drying oil has an iodine value of from 125 to 215 g/100 g, preferably from 140 to 205 g/100 g, more preferably from 150 to 180 g/100 g.

In some embodiments, the at least one drying oil has a saponification value of from 175 to 200 mg KOH/g, preferably from 180 to 195 mg KOH/g.

In some embodiments, the at least one drying oil is selected from the group consisting of tung oil, hemp oil, linseed oil, poppy oil, walnut oil, sunflower oil, cottonseed oil, corn oil, soybean oil, fish oils such as sardine oil and cod liver oil, herring oil, safflower oil, flax seed oil, perilla oil, oiticica oil, and combinations thereof, preferably the at least one drying oil is a tung oil.

In some embodiments, the at least one organic peroxide is selected from the group consisting of diperoxyketals, peroxyketals, monoperoxycarbonates, cyclic ketone peroxides, diacyl peroxides, organosulfonyl peroxides, peroxyesters, peroxydicarbonates and combinations thereof, preferably selected from the group consisting of diperoxyketals, peroxyketals, monoperoxycarbonates peroxyesters and combinations thereof, more preferably selected from the group consisting of OO-t-butyl-O-(2-ethylhexyl)-monoperoxycarbonate, OO-t-butyl-O-2-isopropyl-monoperoxycarbonate, OO-t-amyl-O-(2-ethylhexyl)-monoperoxycarbonate, OO-t-amyl-O-2-isopropyl-monoperoxycarbonate, OO-t-hexyl-O-(2-ethylhexyl)-monoperoxycarbonate and mixtures thereof, optionally in combination with at least one other peroxide.

In some embodiments, the organic peroxide formulation comprises a combination of at least:

1) one monoperoxycarbonate, preferably selected from the group consisting of OO-t-butyl-O-(2-ethylhexyl)-monoperoxycarbonate, OO-t-butyl-O-2-isopropyl-monoperoxycarbonate, OO-t-amyl-O-(2-ethylhexyl)-monoperoxycarbonate, OO-t-amyl-O-2-isopropyl-monoperoxycarbonate, OO-t-hexyl-O-(2-ethylhexyl)-monoperoxycarbonate and mixtures thereof and
2) one peroxyester, preferably chosen in the group consisting of: tert-butyl peroxy-2-ethylhexanoate and tert-amyl peroxy-2-ethylhexanoate, more preferably is a combination of OO-t-amyl-O-(2-ethylhexyl)-monoperoxycarbonate and tert-butyl peroxy-2-ethylhexanoate.

In some embodiments, the organic peroxide formulation further comprises at least one silane component, preferably selected from the group consisting of vinyltriethoxysilane, vinyltris(2-methoxyethoxy)silane, 3-methacryloxypropyltriethoxysilane, 3-methacryloxypropyltrimethoxysilane, 3-glycidoxypropyltrimethoxysilane, N-2-(aminoethyl)-3-aminopropyltrimethoxysilane, N-2-(aminoethyl)-3-aminopropyltriethoxysilane, 3-mercaptopropyltrimethoxysilane and mixtures thereof, and that is more preferably 3-methacryloxypropyltriethoxysilane or/and 3-methacryloxypropyltrimethoxysilane.

In some embodiments, the weight ratio of the drying oil to the organic peroxide is lower than or equal to 0.45, preferably from 0.025 to 0.45, more preferably from 0.03 to 0.3, more preferably from 0.03 to 0.25, and even more preferably from 0.05 to 0.2.

In some embodiments, the organic peroxide formulation further comprises at least one coagent, preferably selected from the group consisting of triallyl cyanurate, triallyl isocyanurate, N,N'-m-phenylene dimaleimide, triallyl trimellitate, trimethylolpropane triacrylate, t trimethylolpropane trimethacrylate, trivinyl cyclohexane and mixtures thereof.

The invention also relates to a composition comprising at least one polymer and an organic peroxide formulation as described above.

In some embodiments, the at least one polymer is an ethylene polymer, in particular a poly(ethylene-vinyl acetate) and/or a polyolefin elastomer.

In some embodiments, the amount of the at least one drying oil in the composition is from 0.005 to 10 parts by weight, preferably from 0.01 to 5 parts by weight, more preferably from 0.02 to 1 parts by weight, for 100 parts by weight of the at least one polymer.

The invention also relates to a method for preparing an organic peroxide formulation as described above, comprising mixing the at least one organic peroxide and the at least one drying oil.

The invention also relates to a method for manufacturing an article comprising a step of curing the composition as described above.

The invention also relates to an article, in particular a film, obtainable by the method as described above.

The invention also relates to the use of an organic peroxide formulation as described above for curing a polymer, said polymer being preferably selected from the group consisting of the poly(ethylene-vinyl acetate), the polyolefin elastomers and combinations thereof.

The present invention enables to meet the abovementioned need. In particular, the invention provides organic peroxide formulations making it possible to increase the scorch time and thus to minimize the risk of premature crosslinking, and to improve crosslinking density and crosslinking rate.

This is achieved by the presence in the peroxide formulation of a drying oil that is in a specific weight ratio relative to the organic peroxide.

DETAILED DESCRIPTION

The invention will now be described in more detail without limitation in the following description.

Unless otherwise mentioned, the percentages in the present text are percentages by weight.

In the present text, the amounts indicated for a given species can apply to this species according to all its definitions (as mentioned in the present text), including the narrower definitions.

Organic Peroxide Formulation

The organic peroxide formulation of the invention comprises at least one organic peroxide having a one hour half-life temperature (HLT) of from 90° C. to 130° C.

The organic peroxide may be any organic peroxide having a one hour HLT as mentioned above.

Preferably, the organic peroxide has a one hour half-life temperature of from 95° C. to 125° C., more preferably has a one hour half-life of from 110° C. to 125° C., even more preferably from 115 to 125° C.

The term "one hour half-life temperature" represents the temperature at which half of the organic peroxide has decomposed in a given time of one hour. Conventionally, the "one hour half-life temperature" is measured in n-decane or n-dodecane.

For examples, the organic peroxide may be selected from the group consisting of diperoxyketals, peroxyketals, monoperoxycarbonates, cyclic ketone peroxides, diacyl peroxides, organosulfonyl peroxides, peroxyesters, peroxydicarbonates and combinations thereof. More particularly, the organic peroxide may be selected from the group consisting of diperoxyketals, peroxyketals, monoperoxycarbonates peroxyesters, and combinations thereof.

For the purposes of the invention, the "diperoxyketals" include the peroxides that contain two peroxides groups (O—O) on at least one same carbon. Examples of diperoxyketals suitable for the invention are 1,1-di(t-butylperoxy)-3,3,5-trimethylcyclohexane; 1,1-di(t-butylperoxy)cyclohexane; n-butyl 4,4-di(t-amylperoxy) valerate; ethyl 3,3-di(t-butylperoxy) butyrate; 2,2-di(t-amylperoxy) propane; 3,6,6,9,9-pentamethyl-3-ethoxycarbonylmethyl-1,2,4,5-tetraoxacyclononane; n-butyl-4,4-bis(t-butylperoxy) valerate; ethyl-3,3-di(t-amylperoxy) butyrate; and mixtures thereof.

The term "peroxyketal" means a compound of the general formula $(R_3)(R_4)C(—OR_1)(—OOR_2)$, in which:

$R_1$ represents a linear or branched, preferably $C_1$-$C_{12}$, preferably $C_1$-$C_4$, and more preferably $C_1$, alkyl group, or represents a cycloalkyl group with $R_2$, $R_2$ represents a linear or branched, preferably $C_1$-$C_{12}$, preferably $C_4$-$C_{12}$, and more preferably $C_5$, alkyl group, or represents a cycloalkyl group with $R_1$, $R_3$ represents a hydrogen atom or a linear or branched, preferably $C_1$-$C_{12}$, more preferably $C_4$-$C_{12}$, alkyl group, or represents a cycloalkyl group with $R_4$, $R_4$ represents a hydrogen atom or a linear or branched, preferably $C_1$-$C_{12}$, more preferably $C_4$-$C_{12}$, alkyl group, or represents a cycloalkyl group with $R_3$.

Preferably, $R_3$ forms a cycloalkyl group with $R_4$.

Preferably, when $R_3$ is a hydrogen atom, $R_4$ is a linear or branched, preferably $C_1$-$C_{12}$, more preferably $C_4$-$C_{12}$, alkyl group.

The peroxyketal according to the invention preferably has the general formula (I) below:

(I)

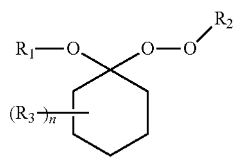

in which formula (I):

$R_1$ represents a linear or branched $C_1$-$C_4$, preferably $C_1$, alkyl group, $R_2$ represents a branched $C_4$-$C_{12}$, preferably $C_5$, alkyl group, n denotes zero or an integer from 1 to 3, $R_3$ represents a linear or branched $C_1$-$C_3$ alkyl group.

$R_1$ preferably represents a linear, more particularly $C_1$-$C_2$, more preferably $C_1$, alkyl group.

$R_2$ preferably represents a branched $C_4$-$C_5$, more preferably $C_5$, alkyl group.

Preferably n denotes zero.

$R_3$ preferably represents a linear or branched, $C_1$-$C_2$, more preferably $C_1$, alkyl group.

Preferably, in the formula (I), $R_1$ represents a linear or branched, $C_1$-$C_2$ alkyl group, $R_2$ represents a branched $C_4$-$C_5$ alkyl group, and n denotes zero.

More preferably still, in the formula (I), $R_1$ represents a $C_1$ alkyl group, $R_2$ represents a branched $C_5$ alkyl group and n denotes zero.

The organic peroxide or peroxides is or are preferably selected from the group consisting of 1-methoxy-1-tert-amylperoxycyclohexane (TAPMC), 1-methoxy-1-t-butylperoxycyclohexane (TBPMC), 1-methoxy-1-t-amylperoxy-3,3,5-trimethylcyclohexane, 1-methoxy-1-t-butylperoxy-3,3,5-trimethylcyclohexane, 1-ethoxy-1-t-amylperoxycyclohexane, 1-ethoxy-1-t-butylperoxycyclohexane, 1-ethoxy-1-t-butyl-3,3,5-peroxycyclohexane and mixtures thereof. More preferably still, the organic peroxide according to the invention is 1-methoxy-1-tert-amylperoxycyclohexane (TAPMC).

As peroxyesters useful for the present invention, mention can be made of 2,5-dimethyl-2,5-di(benzoylperoxy)hexane; t-butyl perbenzoate; t-butylperoxy acetate; t-butylperoxy-2-ethylhexanoate; t-amyl perbenzoate; t-amyl peroxy acetate; t-butyl peroxy isobutyrate; 3-hydroxy-1,1-dimethyl t-butyl peroxy-2-ethyl hexanoate; OO-t-amyl-O-hydrogen-monoperoxy succinate; OO-t-butyl-O-hydrogen-monoperoxy succinate; di-t-butyl diperoxyphthalate; t-butylperoxy (3,3,5-trimethylhexanoate); 1,4-bis(t-butylperoxycarbo) cyclohexane; t-butylperoxy-3,5,5-trimethylhexanoate; t-butyl-peroxy-(cis-3-carboxy)propionate; allyl 3-methyl-3-t-butylperoxy butyrate; and mixtures thereof.

Monoperoxycarbonates suitable for the present invention are OO-t-butyl-O-2-isopropyl-monoperoxycarbonate; OO-t-amyl-O-2-isopropyl-monoperoxycarbonate, OO-t-hexyl-O-isopropyl-monoperoxycarbonate, OO-t-butyl-O-(2-ethylhexyl)-monoperoxycarbonate; OO-t-amyl-O-(2-ethylhexyl)-monoperoxycarbonate, OO-t-hexyl-O-(2-ethylhexyl)-monoperoxycarbonate, 1,1,1-tris[2-(t-butylperoxy-carbonyloxy)ethoxymethyl]propane; 1,1,1-tris [2-(t-amylperoxy-carbonyloxy) ethoxymethyl]propane; 1,1,1-tris[2-(cumylperoxy-cabonyloxy) ethoxymethyl]propane; OO-t-amyl-O-n-propyl monoperoxycarbonate; OO-t-octyl-O-isopropyl-monoperoxycarbonate; OO-t-octyl-O-(2-ethylhexyl)-monoperoxycarbonate; and mixtures thereof.

Diacyl peroxides suitable for the invention include di(4-methylbenzoyl) peroxide; di(3-methylbenzoyl) peroxide; di(2-methylbenzoyl) peroxide; didecanoyl peroxide; dilauroyl peroxide; 2,4-dibromo-benzoyl peroxide; succinic acid peroxide; dibenzoyl peroxide; di(2,4-dichloro-benzoyl) peroxide; and mixtures thereof.

Imido peroxides may also be used, as such of the type described in PCT application publication WO 97/03961.

Preferably, the organic peroxide comprises or consists in at least one monoperoxycarbonate. More preferably, the peroxide comprises or consists in at least one OO-t-alkyl-O-alkyl monoperoxycarbonate.

Advantageously, the organic peroxide is selected from the group consisting of OO-t-amyl-O-2-isopropyl-monoperoxycarbonate (TAIC), OO-t-amyl-O-n-propyl monoperoxycarbonate (TAPC), OO-t-butyl-O-2-isopropyl-monoperoxycarbonate (TBIC), t-octyl-isopropyl-monoperoxycarbonate (TOIC), OO-t-hexyl-O-isopropyl-monoperoxycarbonate (THIC), OO-t-amyl-O-(2-ethylhexyl)-monoperoxycarbonate (TAEC), OO-t-butyl-O-(2-ethylhexyl)-monoperoxycarbonate (TBEC), OO-t-octyl-O-(2-ethylhexyl)-monoperoxycarbonate (TOEC), OO-t-hexyl-O-(2-ethylhexyl)-monoperoxycarbonate (THEC) and mixtures thereof. More preferably, the organic peroxide is selected from the group consisting of OO-t-butyl-O-(2-ethylhexyl)-monoperoxycarbonate (TBEC), OO-t-butyl-O-2-isopropyl-monoperoxycarbonate (TBIC), OO-t-amyl-O-(2-ethylhexyl)-monoperoxycarbonate (TAEC), OO-t-amyl-O-2-isopropyl-monoperoxycarbonate (TAIC), OO-t-hexyl-O-(2-ethylhexyl)-monoperoxycarbonate (THEC) and mixtures thereof. These monoperoxycarbonates may optionally be used in combination with at least one another peroxide, such as those mentioned above (for example t-butylperoxy 2-ethylhexanoate).

Even more preferred organic peroxides are TBEC, TAEC, THEC, or a mixture thereof, optionally in combination with at least one another peroxide, such as those mentioned above (for example t-butylperoxy 2-ethylhexanoate). Most preferred organic peroxides are TBEC, TAEC or a mixture thereof, optionally in combination with at least one another peroxide, such as those mentioned above (for example t-butylperoxy 2-ethylhexanoate).

Advantageously, the organic peroxide formulation of the invention comprises a combination of at least:

1) one monoperoxycarbonate, preferably selected from the group consisting of OO-t-butyl-O-(2-ethylhexyl)-monoperoxycarbonate, OO-t-butyl-O-2-isopropyl-monoperoxycarbonate, OO-t-amyl-O-(2-ethylhexyl)-monoperoxycarbonate, OO-t-amyl-O-2-isopropylmonoperoxycarbonate, OO-t-hexyl-O-(2-ethylhexyl)-monoperoxycarbonate and mixtures thereof and 2) one peroxyester, preferably chosen in the group consisting of: tert-butyl peroxy-2-ethylhexanoate and tert-amyl peroxy-2-ethylhexanoate, more preferably is a combination of at least OO-t-amyl-O-(2-ethylhexyl)-monoperoxycarbonate and tert-butyl peroxy-2-ethylhexanoate.

Preferably, when a combination of at least one monoperoxycarbonate and one peroxyester is used, it comprises from 70 to 97 wt % of monoperoxycarbonate and from 3 to 30 wt % of peroxyester, relative to the total weight of the combination.

The organic peroxide(s) present in the formulation can consist of an organic peroxide (including a combination of organic peroxides) as defined above.

The organic peroxide may be present in the formulation in an amount of from 40 to 99% by weight, based on the total weight of the organic peroxide formulation. Preferably, the organic peroxide is present in the formulation in an amount of from 50 to 98% by weight, even more preferably from 60 to 97% by weight, based on the total weight of the organic peroxide formulation.

The organic peroxide formulation of the invention also comprises a least one drying oil. By "drying oil" is meant an oil having an iodine value higher that 110 g/100 g, as measured according to standard GB/T5532-2008. Any drying oils known to the skilled person can be employed in the organic peroxide formulation of the present invention. Drying oils may include oils derived from plant, animal, and fish sources including, for example, glycerol triesters of fatty acids which are characterized by relatively high levels of polyunsaturated fatty acids, especially eleostearic acid and alpha-linolenic acid. Advantageously, the at least one drying oil is selected from the group consisting of tung oil, hemp oil, biofene or trans-beta-farnesene (e.g. the one made by Amyris), linseed oil, poppy oil, walnut oil, sunflower oil, cottonseed oil, corn oil, soybean oil, fish oils such as sardine oil and cod liver oil, herring oil, safflower oil, flax seed oil, perilla oil, oiticica oil, and combinations thereof preferably from the group consisting of tung oil, hemp oil, linseed oil, poppy oil, walnut oil, sunflower oil, cottonseed oil, corn oil, soybean oil, fish oils such as sardine oil and cod liver oil, herring oil, safflower oil, flax seed oil, perilla oil, oiticica oil, and combinations thereof.

More preferably, the drying oil comprises, consists essentially of, or consists of, tung oil, linseed oil, fish oils, in particular cod liver oil, walnut oil, oiticica oil, poppy oil. Most preferably the drying oil comprises, consists essentially of, or consists of, tung oil or linseed oil, and in particular tung oil.

The above-mentioned oil may be modified or not. It may be a virgin oil or a refined oil.

The drying oil used in the formulation of the invention has preferably an iodine value of from 125 to 215 g/100 g, preferably from 140 to 205 g/100 g, more preferably from 150 to 180 g/100 g. The iodine value may be measured according to standard GB/T5532-2008.

The drying oil can have a saponification value of from 175 to 210 mg KOH/g, preferably from 182 to 195 mg KOH/g.

The peroxide formulation advantageously contains the drying oil in an amount of from 1 to 35% by weight, based on the total weight of the organic peroxide formulation. More preferably, the organic peroxide formulation of the invention comprise the drying oil in an amount of from 2 to 25% by weight, more preferably from 3 to 20% by weight, even more preferably from 5 to 15% by weight, based on the total weight of the organic peroxide formulation.

The weight ratio of the drying oil to the organic peroxide in the organic peroxide formulation is lower than or equal to 0.60, preferably lower than 0.45. More preferably, the weight ratio of the drying oil to the organic peroxide is from 0.025 to 0.45, preferably from 0.03 to 0.3, more preferably from 0.03 to 0.025, even more preferably from 0.05 to 0.2, even more preferably from 0.1 to 0.2.

When two or more organic peroxides are present in the organic peroxide formulation, the weight ratio of the drying oil to the organic peroxide is based on the total weight of the organic peroxides.

When two or more drying oils are present in the organic peroxide formulation, the weight ratio of the drying oils to the organic peroxide is based on the total weight of the drying oils.

The organic peroxide formulation may also comprise a silane component. The silane component has a scorch-protecting effect and makes it possible to further increase the scorch time. The silane component may further act as a coupling agent, the silane component making it possible to improve the adhesion properties of the polymer composition in which the peroxide formulation is used.

In some embodiments, the silane component may be a silane component with an amino functionality, a silane component with a sulfur functionality, a silane component with an epoxy functionality, a silane component with a (meth)acryl functionality, a silane component with a chloro functionality and/or a silane component with a vinylyl functionality.

The silane component may be selected from the group consisting of 3-aminopropyltriethoxysilane; 3-aminopropyltrimethoxysilane; aminopropylmethyldimethoxysilane; N-2-(aminoethyl)-3-aminopropyltrimethoxysilane; N-2-(aminoethyl)-3-aminopropyltriethoxysilane; N-2-(aminoethyl)-3-aminopropylmethyldimethoxysilane; diethylenetriaminopropyltrimethoxysilane; diethylenetriaminopropyltriethoxysilane; diethylenetriaminopropylmethyldimethoxysilane; diethylenetriaminopropylmethyldiethoxysilane; 3-cyclohexylaminopropyltrimethoxysilane; hexanediaminomethyldiethoxysilane; anilinomethyltrimethoxysilane; anilinomethyltriethoxysilane; diethylaminomethyltriethoxysilane; (diethylaminoethyl)methyldiethoxysilane; N-methylaminopropyltrimethoxysilane; bis(triethoxysilylpropyl)tetrasulfide; bis (triethoxysilylpropyl)disulfide; bis(3-ethoxydimethylsilylpropyl)oligosulfur, 3-3-mercaptopropyltriethoxysilane; 3-mercaptopropyltrimethoxysilane; mercaptopropylmethyldimethoxysilane; 3-thiocyanatopropyltriethoxysilane; 3-glycidoxypropyltrimethoxysilane; 3-glycidoxypropyltriethoxysilane; 3-glycidoxypropylmethyldiethoxysilane; 3-glycidoxypropylmethyldimethoxysilane; 3-methacryloxypropyltrimethoxysilane; 3-methacryloxypropyltriethoxysilane; 3-methacryloxypropylmethyldimethoxysilane; 3-chloropropyltrimethoxysilane; 3-chloropropyltriethoxysilane; chloromethyltriethoxysilane; chloromethyltrimethoxysilane; dichloromethyltriethoxysilane; vinyltrimethoxysilane; vinyltriethoxysilane; vinyltris(2-methoxyethoxy)silane; and mixtures thereof.

Preferably, the silane component is selected from the group consisting of vinyltriethoxysilane, vinyltris(2-methoxyethoxy)silane, 3-methacryloxypropyltriethoxysilane, 3-methacryloxypropyltrimethoxysilane, 3-glycidoxypropyltrimethoxysilane, N-2-(aminoethyl)-3-aminopropyltrimethoxysilane, N-2-(aminoethyl)-3- aminopropyltriethoxysilane, 3-mercaptopropyltrimethoxysilane and mixtures thereof. More preferably, the silane component comprises, or consists of, 3-methacryloxypropyltriethoxysilane or/and 3-methacryloxypropyltrimethoxysilane, even more preferably the silane component is 3-methacryloxypropyltrimethoxysilane.

The amount of silane component in the organic peroxide formulation is advantageously of from 5 to 50% by weight, preferably from 10 to 50% by weight, more preferably from 20 to 40% by weight, based on the total weight of the organic peroxide formulation.

The weight ratio of the silane component to the organic peroxide is preferably from 0.1 to 1, more preferably from 0.3 to 0.7.

When two or more organic peroxides are present in the organic peroxide formulation, the weight ratio of the silane component to the organic peroxides is based on the total weight of the organic peroxides.

When two or more silane components are present in the organic peroxide formulation, the weight ratio of silane components to the organic peroxide is based on the total weight of the silane components.

The organic peroxide formulation may consist essentially of, or consist of, the at least at least one organic peroxide and the at least one drying oil.

Alternatively, organic peroxide formulation may consist essentially of, or consist of, the at least at least one organic peroxide, the at least one drying oil and the at least one silane component.

Alternatively, the organic peroxide formulation may further comprise a coagent (which is not an organic peroxide). Advantageously, said coagent bears at least one carbamate, maleimide, acrylate, methacrylate or allyl functional group. Allyl carboxylates may be used, which may be selected in the group consisting of the allyl, diallyl and triallyl type.

The coagent may be chosen from the group consisting of divinylbenzene, diisopropenyl benzene, alpha methylstyrene, alpha-methylstyrene dimer, ethylene glycol dimethacrylate, phenylene dimethacrylate, diethylene glycol dimethacrylate, triethylene glycol dimethacrylate, tetraethylene glycol dimethacrylate, polyethylene glycol 200 dimethacrylate, polyethylene glycol 400 dimethacrylate, 1,3-butanediol dimethacrylate, 1,4-butanediol dimethacrylate, 1,6-hexanediol dimethacrylate, 1,12-dodecanediol dimethacrylate, 1,3-glycerol dimethacrylate, diurethane dimethacrylate, trimethylolpropane trimethacrylate, bisphenol A epoxy diacrylate, dipropylene glycol diacrylate, tripropylene glycol diacrylate, polyethylene glycol 600 diacrylate, ethylene glycol diacrylate, diethylene glycol diacrylate, triethylene glycol diacrylate, tetraethylene glycol diacrylate, neopentyl glycol ethoxylate diacrylate, butanediol diacrylate, hexanediol diacrylate, aliphatic urethane diacrylate, trimethylolpropane triacrylate, trimethylolpropane ethoxylate triacrylate, trimethylolpropane propoxylate triacrylate, glycerol propoxylate triacrylate, aliphatic urethane triacrylate, dipentaerythritol pentaacrylate, triallyle cyanurate (TAC), triallyle isocyanurate (TAIC), triallyl trimellitate, N,N'-m-phenylene dimaleimide, butadiene, chloroprene, isoprene, trivinylcyclohexane and mixtures thereof.

More preferably, the coagent is selected from the group consisting of triallyl cyanurate, triallyl isocyanurate, N,N'-m-phenylene dimaleimide, triallyl trimellitate, trimethylolpropane triacrylate, trimethylolpropane trimethacrylate, trivinyl cyclohexane and mixtures thereof, even more preferably is selected from the group consisting of triallyl cyanurate (TAC), triallyl isocyanurate (TAIC), trimethylolpropane triacrylate (TMPTA), trimethylolpropane trimethacrylate (TMPTMA) and mixtures thereof, and most preferably is triallyl isocyanurate (TAIC).

The main purpose of using a coagent is to increase the level of crosslinking of the polymer cured using the formulation of the invention. The coagent also makes it possible to reduce residual gas emission during the decomposition of the peroxides, and to ultimately reduce the number of bubbles in the encapsulating film.

The weight ratio of the coagent to the organic peroxide is preferably from 0.1 to 10, more preferably from 0.3 to 3, even more preferably from 0.4 to 1.

When two or more organic peroxides are present in the organic peroxide formulation, the weight ratio of the coagent to the organic peroxide is based on the total weight of the organic peroxides.

When two or more coagents are present in the organic peroxide formulation, the weight ratio of coagents to the organic peroxide is based on the total weight of the coagents.

In some embodiments, the organic peroxide formulation may consist essentially of, or consist of, the at least at least one organic peroxide, the at least one drying oil, the at least one silane component and the at least one coagent.

In other embodiments, the organic peroxide formulation may comprise one or more other additives, preferably chosen from the group consisting of the UV stabilizers, the UV absorbers, the coupling agents, the fillers, the plasticizers, the flame retardants, the antioxidants, the dyes and pigments, the free radical traps and mixtures thereof. UV stabilizers may be chosen among hindered amine light stabilizers (HALS). UV absorbers may be selected, for instance, from benzophenones, triazines and benzotriazoles. UV stabilizers and UV absorbers may be present in the organic formulation in a weight ratio relative to the organic peroxide of from 0.0005 to 0.01. As examples of coupling agents (other than the silane components described above), mention can be made of monoalkyl titanates. Inorganic fillers such as silicon dioxide, alumina, talc, calcium carbonate may be added to increase mechanical strength of the polymeric material once crosslinked using the present peroxide formulation, although nanometric clays are preferred because of the transparency they provide. Examples of plasticizers are paraffinic or aromatic mineral oils, phthalates, azelates, adipates and the like. Antioxidants may be phenolic, phosphate or sulfur antioxidants. Alternatively or additionally, quinolines such as 1,2-dihydro-2,2,4-trimethylquinoline, may be used as an antioxidant. Organic or mineral pigments may also be added for coloring the polymer composition in which the formulation is intended to be used. Mention can be made in particular of titanium dioxide, which makes it possible to produce a white color, which may be particularly useful when the formulation is used in a polymer composition employed for manufacturing a film intended to be used at the rear face of photovoltaic modules. Examples of free radical traps suitable for the present invention are those selected from the group consisting of nitroxides (in particular 4-hydroxy-TEMPO) and quinones. As used herein, the term "quinone" includes both quinones and hydroquinones. Non-limiting examples of quinones that may be used in formulations of the present invention include mono-tert-butylhydroquinone (MTBHQ), hydroquinone, hydroquinone mono-methyl ether (HQMME) also known as 4-methoxy phenol, mono-t-amyl hydroquinone, hydroquinone bis(2-hydroxyethyl) ether, 4-ethoxy phenol, 4-phenoxy phenol, 4-(benzyloxy) phenol, 2,5-bis(morpholinomethyl) hydroquinone and benzoquinone.

The organic peroxide formulation may consist essentially of, or consist of, the at least at least one organic peroxide, the at least one drying oil, the at least one silane component, the at least one coagent and optionally one or more additives selected from the group consisting of UV stabilizers, UV absorbers, coupling agents, fillers, plasticizers, flame retardants, antioxidants, dyes and pigments, free radical traps and combinations thereof.

The organic peroxide formulation may comprise free radical traps selected from the group consisting of nitroxides, quinones and mixtures thereof.

The organic peroxide formulation may comprise free radical traps in a weight ratio of the free radical traps to the organic peroxide from 0 to 0.5, more preferably from 0 to 0.15, even more preferably from 0 to 0.05, even more preferably from 0 to 0.002.

The organic peroxide formulation may comprise a total amount of nitroxide and quinone free radical traps in a weight ratio relative to the organic peroxide of from 0 to 0.5, more preferably from 0 to 0.15, more preferably from 0 to 0.05, even more preferably from 0 to 0.002.

When two or more organic peroxides are present in the organic peroxide formulation, the weight ratio of the free radical traps to the organic peroxide is based on the total weight of the organic peroxide.

In some advantageous embodiments, the organic peroxide formulation does not comprise (i.e. is devoid of) 4-hydroxy TEMPO and/or MTBHQ, and more particularly, does not comprise nitroxides and/or quinones free radical traps.

The organic peroxide formulation may be devoid of any free radical trap.

Polymer Composition

The present invention also relates to a composition comprising at least one polymer and an organic peroxide formulation as described above (this composition is also called "polymer composition" in the present text).

Thus, the present invention relates in particular to a composition comprising:

at least one polymer, at least one organic peroxide having a one hour half-life temperature of from 90° C. to 130° C., at least one drying oil, and optionally at least one silane component, wherein the weight ratio of the drying oil to the organic peroxide is lower than or equal to 0.60.

The components of the organic peroxide formulation (organic peroxides, drying oils, optional silane components, optional coagents, optional other additives, optional free radical traps), and their weight ratios, may be as described in the above section.

The polymer of the polymer composition of the invention is preferably an ethylene polymer. The ethylene polymer may be an ethylene homopolymer or preferably an ethylene copolymer. Examples of ethylene copolymers are those made from ethylene monomers and at least one other monomer selected from hydrocarbons having at least one unsaturation such as methylene, propylene, butene, pentene, hexene, heptene, octene, butadiene, isoprene and styrene; acryl monomers such as acrylic acid, methacrylic acid, alkyl methacrylate and alkyl acrylate, wherein the alkyl group may be selected from methyl, ethyl, propyl or butyl, for instance; and vinyl monomers such as vinyl acetate and vinyl butyrate. Usually, these copolymers comprise at least 30% by weight of ethylene and at most 70% by weight of the other monomer(s).

Thus, the polymer may advantageously be a copolymer of ethylene and at least one vinyl monomer, and is preferably a poly(ethylene-vinyl acetate) copolymer (EVA).

The EVA copolymer may comprise from 15 to 60% by weight, preferably from 25 to 45% by weight, of units derived from vinyl acetate (VA) monomers. Examples of such EVA copolymers are available under the trade name "Evatane® 18-150" and "Evatane® 40-55" from ARKEMA.

Other ethylene polymers that may be used in the invention have been disclosed, e.g., in EP 2242647. They comprise a functionalized polyolefin, such as a homopolymer of ethylene or a copolymer of ethylene with an alkyl(meth)acrylate or vinyl acetate, which may be functionalized either by grafting of by copolymerization with maleic anhydride or glycidyl methacrylate. This functionalized polyolefin may optionally be mixed with a copolymer of ethylene/carboxylic acid vinyl ester such as EVA.

Alternatively, or additionally, the polymer may advantageously be a polyolefin elastomer (comprising units derived from ethylene or not).

A "polyolefin" in the sense of the present invention means a polymer derived from an olefin, for example ethylene, propylene, butene, hexene, etc.

By "derived from [a monomer]", it is meant that the polymer comprises in its main chain and/or in its adjacent chains (or pendant chains) units resulting from the polymerization or copolymerization of at least said monomer.

"Polyolefin elastomer" (POE) in the sense of the present invention means an elastomeric polymer derived from an olefin (for example, ethylene, propylene, butene, hexene, etc.).

"Elastomer" in the sense of the present invention means a polymer which is capable of undergoing a uniaxial deformation, preferably of at least 20%, at ambient temperature (for example 20° C.) over a time of fifteen minutes, and of regaining its initial shape, preferably with a residual deformation of less than 5% relative to its initial shape, when this stress is no longer exerted.

The polyolefin elastomer according to the present invention is advantageously derived from ethylene. In other words, the polyolefin elastomers preferably comprise at least one unit derived from ethylene.

The polyolefin elastomer according to the present invention preferably further comprises units derived from at least one alpha-olefin.

The polyolefin elastomer preferably comprises a content of at least 15% by weight of units derived from an alpha-olefin, preferably at least 20% by weight, and more preferably at least 25% by weight, based on the total weight of the polymer. The polyolefin elastomer preferably comprises a content of alpha-olefin units of less than 50% by weight, preferably less than 45% by weight, and more preferably still less than 35% by weight, based on the total weight of the polymer. The polyolefin elastomer may therefore comprise a content of alpha-olefin units of from 15% to 50% by weight, preferably from 15% to 45% by weight, more preferably from 15% to 35% by weight, even more preferably from 20% to 35% by weight, based on the total weight of the polymer. The content in alpha-olefin units in the polymer may be measured by carbon-13 nuclear magnetic resonance (NMR) spectroscopy in accordance with the protocol described by Randall (*J. Macromol. Sci.: Rev. Macromol. Chem. Phys*., C29 (2 and 3), 201-317, 1989).

The alpha-olefin is preferably a $C_3$-$C_{20}$ alpha-olefin. It can be linear, branched or cyclic. Preferably, the alpha-olefin is a linear or branched $C_3$-$C_{20}$ alpha-olefin.

The polyolefin elastomer is advantageously a copolymer of ethylene and at least one alpha-olefin, especially a linear or branched $C_3$-$C_{20}$ alpha-olefin, to the exclusion of any other comonomer.

The $C_3$-$C_{20}$ alpha-olefin is preferably selected from the group consisting of propene, 1-butene, 4-methyl-1-pentene, 1-hexene, 1-octene, 1-decene, 1-dodecene, 1-tetradecene, 1-hexadecene and 1-octadecene.

Preferably, the polyolefin elastomer comprises, or consists of, units derived from ethylene and units derived from an alpha-olefin selected from the group consisting of 1-butene, 1-hexene and 1-octene.

The alpha-olefin may also contain a cyclic structure, for example a cyclohexane or cyclopentane structure, leading to an alpha-olefin such as 3-cyclohexyl-1-propene (allylcyclohexane) or vinylcyclohexane.

Certain cyclic olefins, such as norbornene and the corresponding olefins, are considered to be alpha-olefins in the sense of the present invention and may be used in place of the alpha-olefins described above.

Preferably, the at least one organic peroxide is present in the polymer composition in an amount of from 0.05 to 20 parts by weight for 100 parts by weight of polymer (preferably, of ethylene polymer). More preferably, the organic peroxide is present in the polymer composition in an amount of from 0.1 to 3 parts by weight, even more preferably from 0.3 to 1.5 parts by weight, even more preferably from 0.3 to 1.3 parts by weight, for 100 parts by weight of polymer The at least one drying oil may advantageously be present in the polymer composition in an amount of from 0.005 to 10 parts by weight for 100 parts by weight of polymer (preferably, of ethylene polymer), preferably from 0.01 to 5 parts by weight, even more preferably from 0.02 to 1 parts by weight, for 100 parts by weight of polymer.

When present, the at least one silane component may preferably be present in the polymer composition in an amount of from 0.01 to 20 parts by weight for 100 parts by weight of polymer (preferably, of ethylene polymer), more preferably from 0.05 to 5 parts by weight, even more preferably from 0.1 to 1 parts by weight, for 100 parts by weight of polymer.

When present, the at least one coagent may be included in the polymer composition in an amount of from 0.005 to 10 parts by weight, preferably from 0.01 to 5 parts by weight, more preferably from 0.05 to 2 parts by weight, even more preferably from 0.1 to 1 parts by weight, for 100 parts by weight of polymer (preferably, of ethylene polymer).

Other additives, preferably chosen from the UV stabilizers, the UV absorbers, the coupling agents, the fillers, the plasticizers, the flame retardants, the antioxidants, the dyes and pigments, the free radical traps and mixtures thereof, may be present in the polymer composition.

The polymer composition of the invention may consist essentially of, or consist of, the at least one polymer (preferably an ethylene polymer), the at least one organic peroxide, the at least one drying oil, optionally the at least one silane component, optionally the at least one coagent, and optionally the additives (preferably selected from the group consisting of the UV stabilizers, the UV absorbers, the coupling agents, the fillers, the plasticizers, the flame retardants, the antioxidants, the dyes and pigments, the free radical traps and mixtures thereof).

In some embodiments, the polymer composition is devoid of 4-hydroxy TEMPO and/or MTBHQ, and more particularly, is devoid of nitroxides and/or quinones free radical traps. The polymer composition may be devoid of free radical traps.

Preparation Methods

The invention also relates to a method for preparing an organic peroxide formulation as described above, comprising mixing the at least one organic peroxide and the at least one drying oil and optionally the other components of the formulation (such as the at least one silane component, the at least one coagent and/or the other additives).

The mixing step may be carried out in one or more steps (some of the components may thus be premixed before being mixed with the other components of the formulation). The mixing step can be performed using any kind of equipment adapted for mixing formulations containing mostly liquid.

The mixing step is preferably carried out at a temperature below the decomposition temperature of the organic peroxide. It may be carried out at a temperature of from −10° C. to 50° C., preferably from 10° C. to 40° C.

The invention also relates to a method for preparing a polymer composition as described above. Said method comprises a step of mixing the at least one polymer and the organic peroxide formulation as described above. The polymer may be mixed with an organic peroxide formulation previously prepared, or may be mixed, in one or more steps, with any or each of the components of the organic peroxide formulation, and/or any premix of components of the organic peroxide formulation.

The mixing step may be carried out in any conventional device, such as in a continuous mixer, a batch mixer, a compound extruder, or directly in the barrel of a film extrusion line. The temperature of the mixing step is preferably below the decomposition temperature of the peroxide. In particular, the mixing step may be carried out at a temperature ranging from −10 to 120° C., preferably from 10 to 120° C.

Preferably, the method also comprises an impregnation step after the mixing step. In such an impregnation step, the polymer, preferably in the form of pellets, is left to rest after being mixed with the peroxide organic formulation, preferably for at least 1 h, so that the organic peroxide impregnates the polymer pellets.

In the above methods, the components and their amounts may be as described in the previous sections.

Applications

Another object of the invention is the use of an organic peroxide formulation as described above for curing a polymer, preferably an ethylene polymer, more preferably a polymer selected from group consisting of the poly(ethylene-vinyl acetate), the polyolefin elastomers and combinations thereof. Preferably, a polymer composition as described above is formed.

The polymer may be as described above.

The invention also relates to a method for manufacturing an article comprising the steps of:

optionally providing a polymer composition as described above; and curing said composition.

The curing step is advantageously carried out at a temperature of from 120 to 250° C., preferably from 130 to 180° C., more preferably from 130 to 170° C., even more preferably from 130 to 165° C. It may last from 4 to 50 minutes, preferably from 6 to 35 minutes.

Advantageously, the curing step is carried out in the absence of oxygen.

By the expression "in the absence of oxygen", it is meant that the curable composition is at least not intentionally in contact with oxygen during the curing step. In other words, the curable composition is substantially not in the presence of oxygen during the curing step, and preferentially the curable composition is not in the presence of oxygen during the curing step.

Advantageously, the curing step takes place during a lamination step.

Preferably, the method also comprises a step of shaping the polymer composition. This step may be performed prior to and/or simultaneously with the curing step. Advantageously, the step of shaping the polymer composition is selected from a step of molding, a step of extruding, and a step of injection-molding the polymer composition. Preferably, it is an extrusion step.

Preferably, the step of shaping the polymer composition is carried out prior to the step of curing the polymer composition. Thus, preferably, no crosslinking or substantially no crosslinking occurs during the shaping step. When the shaping step is performed prior to the curing step, said shaping step may be carried out at a temperature of from 80 to 150° C., more preferably from 90 to 120° C. Alternatively, the shaping step and the curing step may be conducted in a single step.

In some embodiments, the produced article is a film (or a sheet). In such embodiments, the method comprises a step of shaping the polymer composition so as to form a film. Said step may be carried out using a T-die extruder or, as alternatively, using a twin-screw extruder coupled to a two-roll mill.

The film may for example have a thickness of from 50 to 2000 μm, preferably from 100 to 1000 μm.

The article manufactured by the above-described method may advantageously be selected from the group consisting of encapsulating materials, particularly encapsulants for solar cells, wire and cable insulations, pipes and hoses (including those for automobile radiators, potable water, and underfloor heating, for example), roller coatings, rotational moldings, cellular articles, and shoe soles.

Most preferably, the article is an encapsulating material and more particularly an encapsulant for solar cells.

The invention also relates to an article obtainable by, or obtained by, the method as described above. The article may be as described above.

A further object of the invention is a photovoltaic module comprising an article as described above, preferably a film as described above. The photovoltaic module comprises one or more solar cells, and the article according to the invention (preferably the film) is advantageously an encapsulant for solar cell(s). Preferably, the film directly covers the solar cell(s), i.e. is in contact with the solar cell(s). A film according to the invention may cover both sides of the solar cell(s) or a single side of the solar cell(s), either the side directed to the front of the photovoltaic module or the side directed to the back of the photovoltaic module.

The photovoltaic module preferably further comprises a front sheet, that may directly cover a film according to the invention, and/or (preferably and) a backsheet, that may directly cover a film according to the invention.

The front sheet is most preferably a transparent sheet. It may be, for example, a glass sheet or poly(methyl methacrylate) (PMMA) sheet.

The backsheet may be, for example, a glass sheet (preferably a thin glass sheet) or a PMMA sheet. Alternatively, the backsheet may be a multilayer structure (multilayer film), preferably comprising, or consisting of, a film of electric-insulation polymer, such as polyethylene terephthalate (PET) or polyamide (PA), one or more films based on fluoropolymers, such as polyvinyl fluoride (PVF) or polyvinylidene fluoride (PVDF), and optionally a film of metal, for example of aluminum (the layers being preferably in this order). The backsheet is advantageously a multilayer PVDF/PET film. Alternatively, the multilayer structure of the backsheet may comprise, or consist of, a glass sheet and a film obtainable by curing a polymer composition of the invention as described above.

The solar cells are preferably cells made from crystalline silicon or from organic photovoltaic substances.

The present invention also pertains to a method for manufacturing a photovoltaic module, said method comprising the following steps:

- laminating an assembly comprising successively at least:
  - a front sheet (such as a glass sheet or PMMA sheet),
  - a layer of a polymer composition according to the invention,
  - at least one solar cell (preferably made from crystalline silicon or from organic photovoltaic substances),
  - another layer of a polymer composition according to the invention, and
  - a backsheet (such as a multilayer PVDF/PET film or a glass sheet or a PMMA sheet)
- pressing the laminated assembly.

The laminated assembly may be pressed by conventional techniques while heating and/or under vacuum, for instance at a temperature of from 130 to 250° C., preferably from 130 to 180° C., more preferably from 140 to 165° C. under vacuum, for a time that may range from 4 to 40 minutes, for instance from 6 to 35 minutes. The polymer compositions of the invention may be crosslinked (or cured) during this pressing step or afterwards. Preferably, the step of pressing the laminated assembly and the step of curing the polymer compositions are simultaneous.

EXAMPLES

The following examples illustrate the invention without limiting it.

Example 1

A first basic composition was prepared by mixing a POE polymer (14 MI, ENGAGER from DOW Chemical Company), 0.75 phr of OO-t-butyl-O-2-ethylhexyl-monoperoxycarbonate (TBEC) (Luperox® TBEC from Arkema), 0.3 phr of 3-methacryloxypropyltrimethoxysilane (KH-570 from Sigma-Aldrich) and 0.5 phr of triallyl isocyanurate (TAIC) (from Ourchem) in a 125 ml bottle. The mixture was then heated for 7.5 hours at 40° C. in an oven. During the heating step, the mixture needed to be shaken every 2-3 hours.

Phr means "parts per hundred rubber", and thus, in the present example, means "parts by weight for 100 parts of polymer POE".

OO-t-butyl-O-2-ethylhexyl-monoperoxycarbonate has a one hour half-life temperature of 121° C.

A second basic composition was prepared in the same manner as the first basic composition except that 0.75 phr of OO-tert-amyl O-(2-ethylhexyl) monoperoxycarbonate (TAEC) (Luperox® TAEC, available from Arkema) was used instead of 0.75 phr of TBEC.

OO-tert-amyl O-(2-ethylhexyl) monoperoxycarbonate has a one hour half-life temperature of 117° C.

To these basic compositions, a certain amount of tung oil (from Anhui Refined Oil and Fat CO., Ltd), of an odorless mineral spirit (synthetic iso-paraffin hydrocarbon, from Idemitsu kosan Co. Ltd.) or of refined tung oil (from Anhui Refined Oil and Fat CO., Ltd) was added, as indicated in the table below. The tung oil used in the examples has a saponification value of 193 (determined according to GB/T5534-1995) and an iodine value of 167 g/100 g (determined according to GB/T5532-2008).

TABLE 1

| Composition No. | Tung oil (phr) | Refined tung oil (phr) | Mineral spirit (phr) | oil/organic peroxide weight ratio |
|---|---|---|---|---|
| Peroxide = TBEC | | | | |
| 1 | — | — | — | |
| 2 | — | — | 0.1125 | 0.15 |
| 3 | 0.0375 | — | — | 0.05 |
| 4 | 0.075 | — | — | 0.1 |
| 5 | 0.1125 | — | — | 0.15 |
| 6 | — | 0.0375 | — | 0.05 |
| 7 | — | 0.075 | — | 0.1 |
| Peroxide = TAEC | | | | |
| 8 | — | — | — | |
| 9 | 0.1125 | — | — | 0.15 |

Compositions No. 3, 4, 5, 6, 7 and 9 are compositions according to the invention; compositions No. 1, 2 and 8 are comparative compositions. Compositions No. 1 to 7 comprise TBEC as the organic peroxide; compositions 8 and 9 comprise TAEC as the organic peroxide.

Samples of about 2 to 3 g of the thus produced compositions were deposited in a plate on a Rubber Process Analyser (RPA), of the model type EKT-2003RPA-N from EKTRON TEK. CO., LTD, which is able to measure the cure properties of the samples and includes a software for analyzing the results. Each of the samples was placed in a temperature-controlled cavity between two plates, the lower of which oscillates to apply a cyclic stress or strain to the sample while the upper die is connected to a torque sensor to measure the torque response of the sample to the deformation. Under these conditions, the surfaces of the sample are protected against the presence of air (and thus oxygen) by the metallic surfaces of the plates. The stiffness is recorded continuously as a function of time. The stiffness of the sample increases as crosslinking proceeds.

The RPA is able to provide, inter alia, calculated values of $M_L$ (minimum torque), $M_H$ (maximum torque), $t_{S1}$ (time to attain an increase of 1 dN·m in torque starting from the minimum torque) and $tc_{90}$ (time to attain 90% of the $M_H$-$M_L$ cure state) as defined by International Standards (such as ASTM D5289). $T_{s1}$ represent the scorch time. From these data, the relative degree of crosslinking $M_H$-$M_L$ (or crosslinking density) can be determined.

The RPA was operated at 145° C. with an oscillation amplitude (deformation degree) of 0.5°, an oscillation frequency of 1.667 and strain value of 7 applied to the sample for 30 min, except for examples 10 and 11 where the test was carried for 45 minutes.

The results are set forth in the table below.

TABLE 2

| Composition No. | $T_{s1}$ (s) | $M_H$-$M_L$ (dN · m/s) | $T_{c90}$ (s) |
|---|---|---|---|
| Peroxide = TBEC (RPA test 30 min) | | | |
| 1 | 411 | 2.59 | 1136 |
| 2 | 418 | 2.53 | 1163 |
| 3 | 433 | 2.56 | 1153 |
| 4 | 446 | 2.56 | 1181 |
| 5 | 471 | 2.55 | 1218 |
| 6 | 419 | 2.50 | 1150 |
| 7 | 436 | 2.51 | 1161 |
| Peroxide = TAEC (RPA test 45 min) | | | |
| 8 | 240 | 2.34 | 772 |
| 9 | 268 | 2.50 | 824 |

The compositions of the invention, that comprise tung oil, lead to a longer scorch time compared to the compositions comprising no oil or comprising a mineral spirit. Thus, tung oil is effective as a scorch-protecting agent. In addition, the crosslinking density obtained with the compositions of the invention is not impaired and the $t_{c90}$ remains within an acceptable range. This conclusion is true regardless of the used peroxide. Moreover, it can be seen that refined tung oil acts as an effective scorch-protecting agent as well.

Example 2

A first basic composition was prepared by mixing an EVA polymer (V2825 from JiangSu Sailboat Petrochemical), 0.6 phr of TBEC (Luperox TBEC® from Arkema), 0.3 phr of 3-methacryloxypropyltrimethoxysilane (KH-570 from Sigma-Aldrich) and 0.5 phr of TAIC (from Ourchem) in a 125 ml bottle. The mixture was then heated for 6.5 h at 40° C. in an oven. During the heating step, the mixture needed to be shaken every 2-3 hours.

In the present example, phr means "parts by weight for 100 parts of polymer EVA".

Another basic composition was prepared in the same manner except that 0.6 phr of OO-tert-amyl O-(2-ethylhexyl) monoperoxycarbonate (TAEC) (Luperox® TAEC, available from Arkema) was used instead of 0.6 phr of TBEC.

Yet another basic composition was prepared in the same manner as the first basic composition, except that 1.2 phr of TAEC (Luperox® TAEC) was used instead of 0.6 phr of TBEC.

Yet another basic composition was prepared in the same manner as the first basic composition, except that 1.2 phr of a mixture of 90% by weight of TAEC (Luperox® TAEC) and 10% by weight of t-butylperoxy 2-ethylhexanoate (TBPO) (Luperox® 26 from Arkema) was used instead of 0.6 phr of TBEC.

t-butylperoxy 2-ethylhexanoate has a one hour half-life temperature of 95° C.

Yet another basic composition was prepared in the same manner as the first basic composition, except that 0.75 of TBEC was used instead of 0.6 phr of TBEC.

To each of these compositions, tung oil or castor oil (Castor oil from ADANI) was added or not, as indicated in the following table.

The castor oil, has a saponification index of 180 mg KOH/g and a iodine value of 85 g/100 g determined as described above.

TABLE 3

| Composition No. | Peroxide | Tung oil (phr) | Castor oil (phr) | oil/peroxide weight ratio |
|---|---|---|---|---|
| 10 | TBEC (0.6 phr) | — | | |
| 11 | TBEC (0.6 phr) | 0.09 | | 0.15 |
| 12 | TAEC (0.6 phr) | — | | |
| 13 | TAEC (0.6 phr) | 0.09 | | 0.15 |
| 14 | TAEC (1.2 phr) | — | | |
| 15 | TAEC (1.2 phr) | 0.1 | | 0.08 |
| 16 | 90% TAEC + 10% TBPO (1.2 phr) | — | | |
| 17 | 90% TAEC + 10% TBPO (1.2 phr) | 0.1 | | 0.08 |
| 18 | TBEC (0.75 phr) | — | | |
| 19 | TBEC (0.75 phr) | 0.1125 | | 0.15 |
| 20 | TBEC (0.75 phr) | | 0.1125 | 0.15 |

Compositions No. 11, 13, 15, 17 and 19 are compositions according to the invention; compositions No. 10, 12, 14, 16, 18 and 20 are comparative compositions.

The crosslinking properties of compositions No. 10 to 13 were determined as described in example 1, with a curing time of 30 min.

The crosslinking properties of compositions No. 14 to 17 were determined as described in example 1 but at three different temperatures: at 145° C., at 130° C. and at 110° C. The RPA measurement was carried out for 45 min. Temperatures of 145 and 130° C. simulate the conditions of a lamination process (for example, for manufacturing a photovoltaic module); temperature of 110° C. simulate the conditions of an extrusion process (for example, for forming a film before a lamination process).

The crosslinking properties of compositions No. 18 to 20 were determined as described in example 1 with a curing time of 45 min.

The results are shown in the table below.

TABLE 4

| Composition No. | Temperature (° C.) | $T_{s1}$ (s) | $M_H$-$M_L$ (dN · m/s) | $T_{c90}$ (s) |
|---|---|---|---|---|
| Curing time = 30 min | | | | |
| 10 | 145 | 235 | 3.99 | 871 |
| 11 | 145 | 335 | 4.03 | 1172 |
| 12 | 145 | 159 | 3.74 | 589 |
| 13 | 145 | 197 | 3.72 | 592 |
| Curing time = 45 min Operating temperature of the RPA = 145° C. | | | | |
| 14 | 145 | 100 | 4.37 | 412 |
| 15 | 145 | 109 | 4.38 | 430 |
| 16 | 145 | 99 | 4.09 | 383 |
| 17 | 145 | 108 | 4.31 | 447 |
| 18 | 145 | 237 | 4.13 | 896 |
| 19 | 145 | 292 | 4.04 | 1089 |
| 20 | 145 | 231 | 3.81 | 875 |
| Operating temperature of the RPA = 130° C. | | | | |
| 14 | 130 | 318 | 3.95 | 1099 |
| 15 | 130 | 373 | 3.95 | 1188 |
| 16 | 130 | 290 | 3.75 | 1071 |
| 17 | 130 | 362 | 3.93 | 1158 |
| Operating temperature of the RPA = 110° C. | | | | |
| 14 | 110 | ND | 0.83 | Not relevant |
| 15 | 110 | ND | 0.38 | Not relevant |
| 16 | 110 | 1726 | 1.1 | Not relevant |
| 17 | 110 | ND | 0.42 | Not relevant |

TABLE 4-continued

| Composition No. | Temperature (° C.) | $T_{s1}$ (s) | $M_H$-$M_L$ (dN · m/s) | $T_{c90}$ (s) |
|---|---|---|---|---|

ND = not determinable. This indicates that the increase of 1 dN · m was not attained during the 45 minutes duration of the measurement.

A significant increase in the scorch time is observed with the compositions of the inventions at the operating temperatures of 145° C. and 130° C. compared to the compositions devoid of tung oil, regardless of the used peroxide, while the crosslinking density remains good.

In addition, it can be seen that at the operating temperature of 110° C., very little crosslinking occurs with the compositions of the invention. This is desired because it is preferable that no crosslinking or substantially no crosslinking occurs during the extrusion step for shaping the composition. In contrast, the comparative compositions exhibit a higher crosslinking density à 110° C., which suggests that the presence of tung oil makes it possible to reduce crosslinking at the temperature of 110° C.

When comparing example 20 with examples 18 and 19, no scorch protection was observed when using a castor oil and crosslinking density was even lower than the counter-example without any oil.

The invention claimed is:

1. An organic peroxide formulation comprising:

at least one organic peroxide having a one hour half-life temperature of from 90° C. to 130° C., and at least one drying oil, wherein the weight ratio of the drying oil to the organic peroxide is lower than or equal to 0.60.

2. The organic peroxide formulation of claim 1, wherein the at least one drying oil has an iodine value of from 125 to 215 g/100 g.

3. The organic peroxide formulation of claim 1, wherein the at least one drying oil has a saponification value of from 175 to 210 mg KOH/g.

4. The organic peroxide formulation of claim 1, wherein the at least one drying oil is selected from the group consisting of tung oil, hemp oil, linseed oil, poppy oil, walnut oil, sunflower oil, cottonseed oil, corn oil, soybean oil, fish oils, herring oil, safflower oil, flax seed oil, perilla oil, oiticica oil, and combinations thereof.

5. The organic peroxide formulation of claim 1, wherein the at least one organic peroxide is selected from the group consisting of diperoxyketals, peroxyketals, monoperoxycarbonates, cyclic ketone peroxides, diacyl peroxides, organosulfonyl peroxides, peroxyesters, peroxydicarbonates and combinations thereof.

6. The organic peroxide formulation of claim 1, further comprising at least one silane component.

7. The organic peroxide formulation of claim 6, wherein the at least one silane component is selected from the group consisting of vinyltriethoxysilane, vinyltris(2-methoxyethoxy) silane, 3-methacryloxypropyltriethoxysilane, 3-methacryloxypropyltrimethoxysilane, 3-glycidoxypropyltrimethoxysilane, N-2-(aminoethyl)-3-aminopropyltrimethoxysilane, N-2-(aminoethyl)-3-aminopropyltriethoxysilane, 3-mercaptopropyltrimethoxysilane and mixtures thereof.

8. The organic peroxide formulation of claim 1, wherein the weight ratio of the drying oil to the organic peroxide is lower than or equal to 0.45.

9. The organic peroxide formulation of claim 1, further comprising at least one coagent.

10. The organic peroxide formulation of claim 9, wherein the at least one coagent is selected from the group consisting of triallyl cyanurate, triallyl isocyanurate, N,N'-m-phenylene dimaleimide, triallyl trimellitate, trimethylolpropane triacrylate, trimethylolpropane trimethacrylate, trivinyl cyclohexane and mixtures thereof.

11. The organic peroxide formulation of claim 1, comprising a combination of at least:

1) one monoperoxycarbonate, and 2) one peroxyester.

12. A composition comprising at least one polymer and the organic peroxide formulation of claim 11.

13. The composition of claim 12, wherein the at least one polymer is an ethylene polymer.

14. The composition of claim 12, wherein the amount of the at least one drying oil in the composition is from 0.005 to 10 parts by weight, for 100 parts by weight of the at least one polymer.

15. A method for preparing the organic peroxide formulation of claim 1, comprising mixing the at least one organic peroxide and the at least one drying oil.

* * * * *